US006927194B2

(12) United States Patent
Burts, III

(10) Patent No.: US 6,927,194 B2
(45) Date of Patent: Aug. 9, 2005

(54) WELL KILL ADDITIVE, WELL KILL TREATMENT FLUID MADE THEREFROM, AND METHOD OF KILLING A WELL

(76) Inventor: Boyce Donald Burts, III, 200 Southern Pines, Lafayette, LA (US) 70508

( * ) Notice: Subject to any disclaimer, the term of this patent is extended or adjusted under 35 U.S.C. 154(b) by 265 days.

(21) Appl. No.: 10/211,958

(22) Filed: Aug. 1, 2002

(65) Prior Publication Data

US 2004/0023814 A1 Feb. 5, 2004

(51) Int. Cl.[7] ............................ C09K 3/00; E21B 33/13

(52) U.S. Cl. ....................... 507/225; 507/203; 507/204; 507/211; 507/224; 507/268; 507/269; 507/271; 166/295; 166/300

(58) Field of Search ................................ 507/203, 204, 507/209, 211–217, 224, 225, 219, 221, 268, 269, 271; 166/295, 300, 305.1; 175/72

(56) References Cited

U.S. PATENT DOCUMENTS

| | | | | |
|---|---|---|---|---|
| 3,727,688 A | * | 4/1973 | Clampitt | 166/283 |
| 3,730,273 A | | 5/1973 | Wilson | 166/269 |
| 3,955,998 A | * | 5/1976 | Clampitt et al. | 252/8.05 |
| 3,971,440 A | | 7/1976 | Hessert et al. | 166/270 |
| 4,009,755 A | | 3/1977 | Sandiford | 166/270 |
| 4,043,921 A | * | 8/1977 | Hessert et al. | 507/113 |
| 4,069,869 A | | 1/1978 | Sandiford | 166/270 |
| 4,275,788 A | | 6/1981 | Sweatman | 166/292 |
| 4,566,979 A | * | 1/1986 | Githens | 507/203 |
| 5,947,644 A | | 9/1999 | Gibbons | 405/267 |
| 6,016,869 A | * | 1/2000 | Burts, Jr. | 166/295 |
| 6,016,871 A | * | 1/2000 | Burts, Jr. | 166/300 |
| 6,016,879 A | * | 1/2000 | Burts, Jr. | 175/72 |
| 6,098,712 A | * | 8/2000 | Burts, Jr. | 166/295 |
| 6,102,121 A | * | 8/2000 | Burts, Jr. | 166/295 |
| 6,218,343 B1 | * | 4/2001 | Burts, Jr. | 507/225 |

* cited by examiner

*Primary Examiner*—Philip C. Tucker
(74) *Attorney, Agent, or Firm*—Gilbreth & Associates, P.C.; J.M. Mark Gilbreth; Mary A. Gilbreth

(57) ABSTRACT

For well kill treatment to prevent the intrusion of formation fluids into the wellbore while the well is open, a well kill additive including a dry mixture of water soluble crosslinkable polymer, a crosslinking agent, filter aid, and optionally, a reinforcing material of fibers and/or comminuted plant materials. The method of forming a well kill fluid includes contacting the additive with water or an aqueous solution, with a method of conforming the formation further including the step of injecting the fluid into the wellbore.

34 Claims, No Drawings

WELL KILL ADDITIVE, WELL KILL TREATMENT FLUID MADE THEREFROM, AND METHOD OF KILLING A WELL

BACKGROUND OF THE INVENTION

1. Field of the Invention

The present invention relates to well kill additives and methods of making such additives, to well kill treatment fluids made therefrom and methods of making such fluids, to methods of modifying a well fluid with such additives and/or fluids, to methods of operating a well with such additives and/or fluids, and to methods of killing a well using such additives and/or fluids. In another aspect, the present invention relates to well kill additives comprising polymer, crosslinking agent, and filter aid and methods of making such additives, to well kill treatment fluids made therefrom and methods of making such fluids, to methods of modifying a well fluid with such additives and/or fluids, to methods of operating a well with such additives and/or fluids, and to methods of killing a well using such additives and/or fluids. In even another aspect, the present invention relates to well kill additives comprising a dry mixture of polymer, crosslinking agent, and filter aid and methods of making such additives, to well kill treatment fluids made therefrom and methods of making such fluids, to methods of modifying a well fluid with such additives and/or fluids, to methods of operating a well with such additives and/or fluids, and to methods of killing a well using such additives and/or fluids. In still another aspect, the present invention relates to well kill additives comprising a polymer, crosslinking agent, and diatomaceous earth ("DE") and methods of making such additives, to well kill treatment fluids made therefrom and methods of making such fluids, to methods of modifying a well fluid with such additives and/or fluids, to methods of operating a well with such additives and/or fluids, and to methods of killing a well using such additives and/or fluids.

2. Description of the Related Art

Kill fluids are commonly placed in a wellbore during oil field wellbore operations, including drilling, wellbore completions, and workovers, to kill the well, i.e., prevent the intrusion of formation fluids into the wellbore while the well is open. The kill fluid is often maintained in the wellbore for the entire duration of the operation.

Conventional kill fluids known in the art are typically aqueous liquids, which contain a weighting agent, such as inert inorganic solids in solution or suspension, to increase the density of the fluid. The weighted kill fluid applies a hydrostatic pressure against the formation fluid, which is greater than the pressure exerted by the formation fluid attempting to intrude into the wellbore. This overbalanced hydrostatic pressure prevents the intrusion of formation fluids into the wellbore during performance of the given oil field wellbore operation which is necessary from an operational standpoint to prevent interference from formation fluids and which is also necessary from a safety standpoint. Maintenance of a sufficient hydrostatic pressure in the wellbore reduces the potential of a well kick or blow out.

Thickeners are often included in weighted kill fluids known in the art for leakoff inhibition. See, for example, Hudson et al, SPE Paper No. 10652, which discloses a weighted brine containing a fluid loss control agent, or U.S. Pat. No. 4,391,925 to Mintz et al, which discloses a multiphase kill fluid comprising a number of constituents including a hydrocarbon, a surfactant, a clay and an organic polymer. Advantageous kill fluids are those which prevent formation fluid intrusion into the wellbore while preventing appreciable wellbore fluid leakoff into the formation. Fluid leakoff can undesirably result in formation damage, i.e., permeability reduction, which is manifested in reduced hydrocarbon recovery from the formation or reduced injectivity into the formation.

Under downhole conditions where the wellbore is in direct communication with voids, it can be extremely difficult to prevent fluid leakoff. Conventional kill fluids generally do not exhibit sufficient flow resistance to prevent them from escaping the wellbore into the formation matrix via the high permeability voids. Such leakoff can ultimately result in loss of the hydrostatic pressure overbalance which enables formation fluids to intrude into the wellbore, negating the primary function of the kill treatment. Although it is possible to maintain the hydrostatic pressure overbalance in the face of severe fluid leakoff by replenishing the lost kill fluid, this practice can be cost prohibitive.

U.S. Pat. No. 4,995,461, issued Feb. 26, 1991 to Sydansk noted that the utility of kill fluids was limited, particularly in the presence of voids in direct communication with the wellbore, and further noted a need existed for a kill treatment having utility in hydrocarbon recovery operations over a broad range of operating conditions, and particularly having utility when kill fluids are ineffective. Sydansk even further noted a need existed for a kill treatment, which is effective when severe voids in direct communication with the wellbore are present. Sydansk still further noted that a kill treatment was needed which prevents or minimizes the intrusion of formation fluids into the wellbore and prevents or minimizes the significant leakoff of wellbore fluid from the wellbore in the presence of such voids.

In an effort to overcome deficiencies noted by him in the prior art, Sydansk proposed in both U.S. Pat. Nos. 4,947,935, and 4,995,461, the use of a water soluble carboxylate crosslinking polymer along with a chromic carboxylate complex crosslinking agent for well kill treatment. Sydansk further teaches that the performance requirements of conformance improvement treatment polymers are different from those of kill treatment polymers. Thus, while U.S. Pat. No. 5,377,760, issued Jan. 3, 1995 to Merrill discloses addition of fibers to an aqueous solution of partially hydrolyzed polyacrylamide polymer, with subsequent injection into the subterranean to improve conformance, Sydansk teaches that such would not necessarily work for kill treatment.

Additionally, Merrill's conformance treatment method of mixing the fibers with the polymer solution followed by injection, requires a multiplicity of storage and mixing tanks, and a metering system which must be operated during the operation of the well. Specifically, a first tank will store a water and polymer solution, a second tank will store a water and cross-linking solution, and a third tank will be used to mix fibers with polymer solution from the first tank to create a polymer/fiber slurry. This polymer/fiber slurry is then metered from the third tank and combined with crosslinking solution metered from the second tank to the well bore.

As an advance over the above prior art, U.S. Pat. No. 6,016,869, issued Jan. 25, 2000, to Boyce D. Burts, Jr. for "Well kill additive, well kill treatment fluid made therefrom, and method of killing a well." discloses an additive including a "dry mixture" of water soluble crosslinkable polymer, a crosslinking agent, and a reinforcing material of fibers and/or comminuted plant materials. The method of forming a fluid includes contacting the additive with water or an aqueous solution, with a method of treating the formation further including the step of injecting the fluid into the formation.

While not believed to be related prior art because they relate to different types of well operations, for completeness, attention is directed to five other similar "dry mixture" patents by Boyce D. Burts, Jr., which were filed on the same day (Oct. 31, 1997) as the '869 Patent: U.S. Pat. No. 6,218,343, issued Apr. 17, 2001, for "Additive for, treatment fluid for, and method of plugging a tubing/casing annulus in a well bore," U.S. Pat. No. 6,102,121, issued Aug. 15, 2000, for "Conformance improvement additive, conformance treatment fluid made therefrom, method of improving conformance in a subterranean formation," U.S. Pat. No. 6,098, 712, issued Aug. 8, 2000, for "Method of plugging a well," U.S. Pat. No. 6,016,879, issued Jan. 25, 2000, for "Lost circulation additive, lost circulation treatment fluid made therefrom, and method of minimizing lost circulation in a subterranean formation," and U.S. Pat. No. 6,016,871, issued Jan. 25, 2000, for "Hydraulic fracturing additive, hydraulic fracturing treatment fluid made therefrom, and method of hydraulically fracturing a subterranean formation."

A number of patents discuss the use of diatomaceous earth ("DE") in a well operation.

U.S. Pat. No. 3,380,542, issued Apr. 30, 1968 to Clear, for restoring lost circulation discloses a oil-based drilling fluid, containing a slurry of diatomite and asbestos, used to restore lost circulation during well drilling operations.

U.S. Pat. No. 4,369,844, issued Jan. 25, 1983 to Clear, discloses that various formation sealing agents have been used in the art to form formation seals and/or filter cakes on the wall of a well bore, including diatomaceous earth.

U.S. Pat. No. 4,110,225, issued Aug. 29, 1978 to Cagle, discloses that zones of lost circulation and other undesired fluid communication channels into a wellbore are sealed by isolating a volume in the well including such a zone and applying greater than formation pressure to a novel slurry spotted in the zone until it hardens into a solid, drillable seal. The slurry contains per barrel from 5–50 pounds diatomaceous mix, from about 35 to about 350 pounds of oil well cement, and at a minimum about 5 to 6 pounds of a flake type lost-circulation agent. This '225 patent cites a number of patents that disclose cement/diatomaceous earth compositions, including U.S. Pat. Nos. 2,585,336; 2,793, 957; 2,961,044; 3,467,198; and 3,558,335.

Regarding these patents, the '225 patent notes the following:

Regarding U.S. Pat. No. 2,585,336, the '225 patent notes, "a mixture is made using from 2% to 100% diatomaceous earth, compared to the content of the cement in the slurry. The aim of the inventors was to prevent perlite from settling and to produce a lightweight cement. The diatomaceous earth-cement described in the disclosure is a mixture of Portland cement, perlite and diatomaceous earth, lime, and asbestos fibers."

Regarding U.S. Pat. No. 2,793,957, the '225 patent notes, "refers to a highly permeable cement formed by use of the same basic mixtures of diatomaceous earth with Portland cement, the diatomaceous earth present being from five to seven times the proportion of the Portland cement in the slurry. The aim of the inventors was to produce a light highly permeable cement, entirely opposite to the purpose of my invention."

Regarding U.S. Pat. No. 2,961,044, the '225 patent notes, "discusses and claims a cement composition which has diatomaceous earth in the amounts of from 30% to 70% of the Portland cement. The reason for using the diatomaceous earth was to prevent the strength retrogression of a salt-saturated cement. Thus, while Shell wishes (among other uses) to employ his mixture for squeeze cementing, he produces a relatively high-strength cement plug. There is a real tendency when redrilling such a plug for the bit to be deflected or sidetracked so that the new hole is beside rather than through the bore and the seal is ineffective. This is completely different from my invention which minimizes such tendency by producing a plug at least as drillable as the formation in which it is set. Also, Shell is directed to operations using salt-saturated cement slurries, while I prefer using a fresh or brackish water slurry. I employ lost-circulation agents; he makes no teaching of using such additives. Accordingly, his teaching is quite far from mine."

Regarding both U.S. Pat. Nos. 3,467,198 and 3,558,335, the '225 patent notes, "describe cement compositions having diatomaceous mix present in the amounts from 0.5% to 10% of the amount of Portland cement present to prevent solids-settling."

U.S. Pat. No. 4,369,844, issued Jan. 25, 1983 to Clear, discloses slurries to seal permeable earth formations encountered in the drilling of wells, comprising finely divided paper, diatomaceous earth, and in a further embodiment, lime. A slug of the slurry is spotted at the locus of the permeable formation and defluidized to form a formation seal on which a mud sheath is then deposited.

U.S. Pat. No. 4,505,751, issued Mar. 19, 1985, discloses a silicate/silica cement in oil field applications, including diatomaceous earth as a species of silica compound.

While not believed to be analogous prior art because it relates to earthen pits (for example a ditch) and not to subterranean wellbores nor well operations, U.S. Pat. No. 5,947,644, issued Sep. 7, 1999 to Gibbons et al., is included herein for completeness because it discloses a gelable slurry of aqueous solvent, a crosslinkable polymer, a crosslinking agent, and unconsolidated solids such as diatomaceous earth. This gelable slurry is placed in an earthen pit and allowed to form into a fluid impermeable barrier wall in the earthen pit. The polymer serves to bind the unconsolidated solids to convert the gelable slurry to a nondeformable gelled continuum of consolidated solids, which forms the barrier wall in the earthen pit. As disclosed in the '644 Patent in the Summary of the Invention section, at col. 1, lines 57–67, this gelable slurry is prepared by first forming a liquid gelation solution of the polymer and crosslinking agent, to which is subsequently mixed with the unconsolidated solids, or alternatively, by sequentially mixing the aqueous solvent, crosslinkable polymer, and polymer crosslinking agent with the unconsolidated solids.

Thus, in spite of the advancements in the prior art, there still need for further innovation in well kill additives.

There is need for further innovation for well kill additives utilizing a water soluble polymer.

There is another need for a well kill additive which would allow for simplification of the mixing equipment.

These and other needs in the art will become apparent to those of skill in the art upon review of this specification, including its drawings and claims.

SUMMARY OF THE INVENTION

It is an object of the present invention to provide for further innovation in well kill additives.

It is an another object of the present invention to provide for further innovation for well kill additives utilizing a water soluble polymer.

It is even another object of the present invention to provide for a well kill additive which would allow for simplification of the mixing equipment.

These and other objects of the present invention will become apparent to those of skill in the art upon review of this specification, including its drawings and claims.

According to one embodiment of the present invention, there is provided a well kill additive comprising a dry mixture of water soluble crosslinkable polymer, a crosslinking agent, and a filter aid.

According to another embodiment of the present invention, there is provided a well fluid comprising a well kill fluid, water soluble crosslinkable polymer, a crosslinking agent, and a filter aid.

According to even another embodiment of the present invention, there is provided a method of modifying a well kill fluid. The method includes contacting the well kill fluid with a water soluble crosslinkable polymer, crosslinking agent, and filter aid to form a modified well kill fluid.

According to still another embodiment of the present invention, there is provided a method of killing a well to substantially reduce volumetric flow of a formation fluid across a wellbore face into a wellbore penetrating a formation having a formation matrix and containing said formation fluid below an earthen surface. The method includes placing a well kill fluid comprising water soluble crosslinkable polymer, a crosslinking agent, and filter aid in said wellbore at said wellbore face, wherein said fluid which is placed at said wellbore face does not significantly penetrate the formation matrix. The method also includes forming a nonflowing fluid from said well kill fluid in said wellbore at said wellbore face to substantially reduce said volumetric flow of said formation fluid across said wellbore face into said wellbore, thereby killing said well.

According to yet another embodiment of the present invention, there is provided a method for reducing volumetric flow of a formation fluid across a wellbore face into a wellbore penetrating a formation having a formation matrix and containing said formation fluid below an earthen surface. The method includes placing a well kill fluid comprising water soluble crosslinkable polymer, a crosslinking agent and filter aid in said wellbore at said wellbore face, wherein said fluid which is placed at said wellbore face does not significantly penetrate the formation matrix. The method also includes applying pressure to dewater the well kill fluid to form a nonflowing fluid from said well kill fluid in said wellbore at said wellbore face to substantially reduce said volumetric flow of said formation fluid across said wellbore face into said wellbore, thereby killing said well.

According to even still another embodiment of the present invention, there is provided a method of circulating a well kill fluid in a wellbore penetrating a subterranean formation. The method includes providing a well kill fluid comprising water or an aqueous solution, water soluble crosslinkable polymer, a crosslinking agent, and a filter aid. The method also includes circulating the well kill fluid in the wellbore.

According to even yet another one embodiment of the present invention, there is provided a method of modifying a well kill fluid circulating in a wellbore penetrating a subterranean formation. The method includes introducing a water soluble crosslinkable polymer, crosslinking agent, and filter aid to the circulating well kill fluid.

Various further embodiments of any or all of the above embodiments include any or all of the following in any combination: the filter aid is selected from the group consisting of diatomaceous earth, perlite, glass beads, magnesium silicate, solid thermoplastic or thermoset polymer beads, talc, and calcium silicate; or the polymer is an a carboxylate-containing polymer, and the crosslinking agent is selected from the group consisting of chromium (III) carboxylate complexes, aldehydes, dialdehydes, formaldehydes, glutaraldehyde, dichromates, titanium chelates, phenols, substituted phenols, ethers, aluminum citrate, and aluminates; the filter aid comprises at least one of diatomaceous earth or pearlite; the polymer comprises a low molecular weight polymer having a molecular weight less than 500,000, and a high molecular weight polymer having a molecular weight of at least 500,000; the polymer is a water soluble, carboxylate containing acrylamide, and the crosslinking agent is a chromium (III) carboxylate complex; the filter aid is diatomaceous earth; the filter aid is pearlite; the reinforcing material selected from the group consisting of hydrophilic fibers, hydrophobic fibers, and comminuted plant material; and/or various weight percentages are in the range of about 4 to about 35 weight percent polymer, in the range of about 1 to about 10 weight percent cross linking agent, and in the range of about 55 to about 95 weight percent filter aid, based on the total weight of the polymer, cross linking agent and filter aid.

These and other embodiments of the present invention will become apparent to those of skill in the art upon review of this specification and claims.

DETAILED DESCRIPTION OF THE INVENTION

The present invention is a process employing a material which prevents or minimizes the substantial flow of formation fluids into the wellbore during the performance of conventional oil field wellbore operations, such as drilling, completions, or workovers, while simultaneously preventing or minimizing the leakoff of wellbore fluids into the formation matrix. The material employed in the present process comprises a continuous, nonflowing, crosslinked, water-soluble, polymer gel, crosslinking agent and filter aid.

The utility of the present process in oil field wellbore operations is attributable to the specific composition of the kill additive. The well kill additive of the present invention includes polymer, cross-linking agent, filter aid, and optionally a reinforcing agent, that is preferably either fibers or comminuted particles of plant materials. In a preferred embodiment of the present invention, the well kill additive is a dry mixture of polymer, cross-linking agent and filter aid.

When placed in a wellbore, the additive crosslinks to completion forming a nonflowing polymer which is sufficiently strong to effectively prevent or minimize fluid intrusion into the wellbore, even under high formation fluid pressures and sufficiently strong to effectively prevent or minimize excessive leakoff of the polymer gel out of the wellbore, even in the presence of significant voids in direct communication with the wellbore. The polymer gel is non-damaging to the formation and residual gel remaining in the wellbore is generally reversible if desired.

The well kill additive of the present invention includes polymer, cross-linking agent, filter aid, and optionally a reinforcing material, preferably either fibers or comminuted particles of plant materials, and optionally any other materials that are known in the art. It is to be understood that the well kill additive of the present invention may be in the form of a dry mixture or a slurry. In a preferred embodiment of the present invention, the well kill additive is a dry mixture.

A well fluid of the present invention comprises the additive of the invention. In a method of modifying a well kill fluid to form a modified well kill fluid, the well kill fluid to be modified is contacted the additive or well fluid of the present invention.

Any suitable relative amounts of the polymer, cross-linking agent, filter aid and the optional reinforcing materials may be utilized in the present invention provided that the desired well kill results are achieved. Generally, the relative amounts of each will be determined based on the particular application to which the additive is to be subjected. A suitable amount of crosslinking agent is provided to reach the desired amount of crosslinking. The amount of optional reinforcing material is selected to provide desired physical properties.

Any suitable types of filter aid materials as are known in the filtration art may be utilized as the filter aid component in the present invention. All that is necessary is that the filter aid will function to be "squeezed" and allow migration of the solution of polymer and crosslinking agent into the formation, and will form a plug of the filter aid that will hold the solution in place until it sufficiently crosslinks. Non-limiting examples of which include diatomaceous earth ("DE" or diatomite), perlite (or pearlite), glass beads, magnesium silicate, solid thermoplastic or thermoset polymers generally in powder form, talc (naturally occurring form of hydrous magnesium silicate containing varying proportions of such associated minerals as alpha-quartz, calcite, chlorite, dolomite, kaolin, magnesite, and phlogopite), and calcium silicate (for example, see, U.S. Pat. No. 5,750,038, issued May 12, 1998, to Tsunematsu, for "Method for the preparation of acid-resistant calcium silicate," incorporate herein by reference), and any combination of two or more of the above. Preferably, the filter aid is selected from the group consisting of diatomaceous earth perlite (or pearlite), magnesium silicate, and talc. More preferably, the filter aid is a mineral based type of filter aid, non-limiting examples of which include diatomaceous earth, pearlite, magnesium silicate, talc and calcium silicate, and any combination of two or more of the above. Even more preferably, the filter aid comprises pearlite and/or diatomaceous earth. Still more preferably, the filter aid comprises diatomaceous earth.

The amount of filter aid to be utilized is generally not dependent upon the amount of polymer or crosslinking agent, but rather, is that amount sufficient to form a plug to retain the polymer in place until it crosslinks sufficiently to remain in place on its own. However, in an effort to quantify the amount of filter aid, a weight ratio of filter aid to polymer is provided for convenience.

Generally, the weight ratio of filter aid:polymer in the additive is in the range of about 100:1 to about 1:100, preferably in the range of about 50:1 to about 1:50, more preferably in the range of about 15:1 to about 1:15, even more preferably in the range of about 5:1 to about 1:5, and still more preferably in the range of about 5:1 to about 1:1.

Commercially, it is envisioned that the additive will be packaged in a single bag, to promote ease of use and eliminate the necessity of any measuring and/or mixing at the well site. As a non-limiting example of a commercial embodiment, a 40 pound bag might contain any where from about 1.5 to about 17.5 lbs. polymer, from about 0.4 to about 5 lbs. crosslinking agent, and the balance of from about 17.5 to about 38.1 lbs. filter aid.

In weight percentage terms, examples of weight percentage ranges include from about 4 to about 35 weight percent polymer, from about 1 to about 10 weight percent cross linking agent, and from about 55 to about 95 weight percent filter aid, based on the total weight of the polymer, cross linking agent and filter aid. Specific non-limiting examples of useful compositions include 4% polymer, 1% cross linker, 95% DE, or 24% polymer, 6% cross linker, 70% DE, or 35% polymer, 10% cross linker, 55% DE.

The particle size distribution of the filter aid is selected to allow dewatering of the filter aid (i.e., the solution containing polymer and crosslinking agent will separate from the filter aid), and to allow formation of a plug of the filter aid that retains the polymer and crosslinking agent in the reservoir during crosslinking. It is believed that the particle size distribution will be determined by the reservoir conditions.

Other additives as are known in the well fluid art may be utilized, non limiting examples of which include surfactants, dispersants, retarders, accelerants, weighting agents (such as hematite, barite or calcium carbonate), lost circulation materials and other additives may be provided as necessary or desired.

The polymer utilized in the practice of the present invention is preferably water soluble and must be capable of being pumped as a liquid and subsequently crosslinked in place to form a substantially non-flowing crosslinked polymer which has sufficient strength to withstand the pressures exerted on it. Optionally, when reinforcing materials are utilized, it would have a network structure capable of incorporating reinforcing materials.

While any suitable water soluble polymer may be utilized, the preferred polymer utilized in the practice of the present invention is a water soluble carboxylate-containing polymer, more preferably a water soluble partially hydrolyzed carboxylate-containing polymer. This carboxylate-containing polymer may be any crosslinkable, high molecular weight, water-soluble, synthetic polymer or biopolymer containing one or more carboxylate species.

For an example of polymers and crosslinking agents suitable for use herein and details regarding their making and use, please see any of the above listed patents to Boyce D. Burts, Jr. all herein incorporated by reference, or please see U.S. Pat. Nos. 4,683,949, 4,723,605, 4,744,418, 4,770,245, 4,844,168, 4,947,935, 4,957,166 and 4,989,673, 5,377,760, 5,415,229, 5,421,411, all herein incorporated by reference.

The average molecular weight of the carboxylate-containing polymer utilized in the practice of the present invention is in the range of about 10,000 to about 50,000,000, preferably in the range of about 100,000 to about 20,000,000, more preferably in the range of about 200,000 to about 15,000,000, and still more preferably in the range of about 200,000 to about 10,000,000.

In some instances, a blend of two polymers, a lower molecular weight polymer and a higher molecular weight polymer may be utilized. For example, in some instances where high fluid loss is encountered, such as a hole in the casing, a fault zone, loose sand, unconsolidated zones, or vugular formations, higher molecular weight polymer must be utilized. However, this higher molecular weight polymer causes problems in mixing, pumping and total polymer load. Thus, this higher molecular weight polymer is mixed with a lower molecular weight polymer to provide mixing, pumping and loading as desired.

Generally, this lower molecular weight polymer has a molecular weight less than 1,000,000, preferably less than 500,000, and more preferably less than 200,000. Generally the lower molecular weight polymer will have a molecular weight in the range of about 20,000 to less than 1,000,000, preferably in the range of about 20,000 to less than 500,000, and more preferably in the range of about 200,000 to less than 500,000. The higher molecular weight polymer generally has a molecular weight of at least 1,000,000, preferably from about 1,000,000 to about 50,000,000, more preferably from about 5,000,000 to about 20,000,000, and even more preferably from about 6,000,000 to about 12,000,000.

Biopolymers useful in the present invention include polysaccharides and modified polysaccharides. Non-limiting examples of biopolymers are xanthan gum, guar gum, carboxymethylcellulose, o-carboxychitosans, hydroxyethylcellulose, hydroxypropylcellulose, and modified starches. Non-limiting examples of useful synthetic polymers include acrylamide polymers, such as polyacrylamide, partially hydrolyzed polyacrylamide and terpolymers containing acrylamide, acrylate, and a third species. As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having at least 1%, but not 100%, of the acrylamide groups in the form of carboxylate groups. The acrylamide polymer may be prepared according to any conventional method known in the art, but preferably has the specific properties of acrylamide polymer prepared according to the method disclosed by U.S. Pat. No. Re. 32,114 to Argabright et al incorporated herein by reference.

Any crosslinking agent suitable for use with the selected polymer may be utilized in the practice of the present invention. Non limiting examples of suitable crosslinking agents includes chromium (III) carboxylate complexes, aldehydes, dialdehydes, formaldehydes, glutaraldehyde, dichromates, titanium chelates, phenols, substituted phenols, ethers, aluminum citrate, and aluminates.

Preferably, the crosslinking agent utilized in the present invention is a chromic carboxylate complex.

The term "complex" is defined herein as an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The chromic carboxylate complex useful in the practice of the present invention includes at least one or more electropositive chromium III species and one or more electronegative carboxylate species. The complex may advantageously also contain one or more electronegative hydroxide and/or oxygen species. It is believed that, when two or more chromium III species are present in the complex, the oxygen or hydroxide species may help to bridge the chromium III species. Each complex optionally contains additional species which are not essential to the polymer crosslinking function of the complex. For example, inorganic mono- and/or divalent ions, which function merely to balance the electrical charge of the complex, or one or more water molecules may be associated with each complex. Non-limiting representative formulae of such complexes include:

$[Cr_3(CH_3CO_2)_6(OH)_2]^{1+}$;

$[Cr_3(CH_3CO_2)_6(OH)_2]NO_3 \cdot 6H_2O$;

$[Cr_3(CH_3CO_2)_6(OH)_2]^{3+}$; and $[Cr_3(CH_3CO_2)_6(OH)_2](CH_3CO_2)_3 \cdot H_2O$.

"Trivalent chromium" and "chromic ion" are equivalent terms encompassed by the term "chromium III" species as used herein.

The carboxylate species are advantageously derived from water-soluble salts of carboxylic acids, especially low molecular weight mono-basic acids. Carboxylate species derived from salts of formic, acetic, propionic, and lactic acid, substituted derivatives thereof and mixtures thereof are preferred. The preferred carboxylate species include the following water-soluble species: formate, acetate, propionate, lactate, substituted derivatives thereof, and mixtures thereof. Acetate is the most preferred carboxylate species. Examples of optional inorganic ions include sodium, sulfate, nitrate and chloride ions.

A host of complexes of the type described above and their method of preparation are well known in the leather tanning art. These complexes are described in Shuttleworth and Russel, Journal of the Society of Leather Trades' Chemists, "The Kinetics of Chrome Tannage Part I.," United Kingdom, 1965, v. 49, p. 133–154; "Part III.," United Kingdom, 1965, v. 49, p. 251–260; "Part IV.," United Kingdom, 1965, v. 49, p. 261–268; and Von Erdman, Das Leder, "Condensation of Mononuclear Chromium (III) Salts to Polynuclear Compounds," Eduard Roether Verlag, Darmstadt Germany, 1963, v. 14, p. 249; and incorporated herein by reference. Udy, Marvin J., Chromium. Volume 1: Chemistry of Chromium and its Compounds. Reinhold Publishing Corp., N.Y., 1956, pp. 229–233; and Cotton and Wilkinson, Advanced Inorganic Chemistry 3rd Ed., John Wiley and Sons, Inc., N.Y., 1972, pp. 836–839, further describe typical complexes which may be within the scope of the present invention and are incorporated herein by reference. The present invention is not limited to the specific complexes and mixtures thereof described in the references, but may include others satisfying the above-stated definition.

Salts of chromium and an inorganic monovalent anion, e.g., CrCl3, may also be combined with the crosslinking agent complex to accelerate gelation of the polymer solution, as described in U.S. Pat. No. 4,723,605 to Sydansk, which is incorporated herein by reference.

The molar ratio of carboxylate species to chromium III in the chromic carboxylate complexes used in the process of the present invention is typically in the range of 1:1 to 3.9:1. The preferred ratio is range of 2:1 to 3.9:1 and the most preferred ratio is 2.5:1 to 3.5:1.

The optional reinforcing material of the present invention may comprise fibers or comminuted particles of plant materials, and preferably comprises comminuted particles of one or more plant materials.

Fibers suitable for use in the present invention are selected from among hydrophilic and hydrophobic fibers. Incorporation of hydrophobic fibers will require use of a suitable wetting agent. Preferably, the fibers utilized in the present invention comprise hydrophilic fibers, most preferably both hydrophilic and hydrophobic fibers.

With respect to any particular fiber employed in the practice of the present invention, it is believed that the longer the fiber, the more difficult it is to be mixed uniformly in solution. It is believed that fibers as long as 12,500 microns may tend to aggregate and form clumps. The shorter the fiber, it is believed the easier it is to mix in solution. On the other hand, the shorter the fiber, the greater the quantity necessary to provide the desired level of strength in a reinforced mature gel. In general, the fibers utilized in the present invention will have a length in the range of 100 microns to 3200 microns, preferable 100 microns to 1000 microns.

Non-limiting examples of suitable hydrophobic fibers include nylon, rayon, hydrocarbon fibers and mixtures thereof.

Non-limiting examples of suitable hydrophilic fibers include glass, cellulose, carbon, silicon, graphite, calcined petroleum coke, cotton fibers, and mixtures thereof.

Non-limiting examples of comminuted particles of plant materials suitable for use in the present invention include any derived from: nut and seed shells or hulls such as those of peanut, almond, brazil, cocoa bean, coconut, cotton, flax, grass, linseed, maize, millet, oat, peach, peanut, rice, rye, soybean, sunflower, walnut, wheat; various portions of rice including the rice tips, rice straw and rice bran; crude pectate pulp; peat moss fibers; flax; cotton; cotton linters; wool; sugar cane; paper; bagasse; bamboo; corn stalks; various tree portions including sawdust, wood or bark; straw; cork; dehydrated vegetable matter (suitably dehydrated carbonhydrates such as citrus pulp, oatmeal, tapioca, rice grains, potatoes, carrots, beets, and various grain sorghams); whole ground corn cobs; or various plant portions the corn cob light density pith core, the corn cob ground woody ring portion, the corn cob coarse or fine chaff portion, cotton seed stems, flax stems, wheat stems, sunflower seed stems, soybean stems, maize stems, rye grass stems, millet stems, and various mixtures of these materials.

Optionally a dispersant for the comminuted plant material in the range of about 1 to about 20 pounds, preferably in the range of about 5 to about 10 pounds, and more preferably in the range of about 7 to about 8 pounds of dispersant may be utilized per pound of comminuted plant material. A non-limiting example of a dispersant would be NaCl.

Preferred comminuted materials useful in the practice of the present invention include those derived from peanuts, wood, paper any portion of rice seed or plant, and any portion of corn cobs.

These various materials can be comminuted to very fine particle sizes by drying the products and using hammer mills, cutter heads, air control mills or other comminution methods as is well known to those of skill in the comminution art. Air classification equipment or other means can be used for separation of desired ranges of particle sizes using techniques well-known in the comminution art.

Any suitable size of comminuted material may be utilized in the present invention, along as such size produces results which are desired. Of course, the particle size will be a function of diameter of the porosity passages. While the present invention will find utility for passages on the order of microns in diameter, it will also find utility on larger passages, for example, those with diameters greater than 1/64, 1/16 or event 1/8 of an inch.

In most instances, the size range of the comminuted materials utilized herein will range from below about 8 mesh ("mesh" as used herein refers to standard U.S. mesh), preferably from about −65 mesh to about −100 mesh, and more preferably from about −65 mesh to about −85 mesh. Specifically preferred particle sizes for some materials are provided below.

Preferred mixtures of comminuted materials useful in the practice of the present invention include a rice fraction and peanut hulls; a rice fraction and wood fiber and/or almond hulls; a rice fraction and a corn cob fraction, preferably a chaff portion; and a corn cob fraction, preferably a pith or chaff portion, a rice fraction, and at least one of wood fiber, nut shells, paper and shredded cellophane.

Rice is commercially available in the form of rice hulls, rice tips, rice straw and rice bran, as these various parts of the rice plant are separated commercially and are widely available from rice mills. Preferably, the size range of the rice fraction utilized herein will range from below about 8 mesh ("mesh" as used herein refers to standard U.S. mesh), preferably from about −65 mesh to about −100 mesh, and more preferably from about −65 mesh to about −85 mesh.

After the corn kernels are removed, corn cobs consist of four principle parts that are arranged concentrically. The central portion is a very light density pith core, that is surrounded by a woody ring, that in turn is surrounded by a coarse chaff portion, that in turn is covered by a fine chaff portion. The coarse and fine chaff portions form the sockets for anchoring the corn kernels to the corncob. The normal methods of grinding corncobs produce a mixture of all four parts enumerated above. It is possible, however, to separate the woody ring material from the remainder of the cob. The chaff portion of the corncob remaining after removal of the woody ring material is known as "bees wings". In the present invention, any of the pith or chaff portions ("BPC") are the preferred portions of the corn cob, with the chaff portions being more preferred. A range of particle sizes of pith and chaff can be obtained from comminution, but the size range smaller than about 8 mesh is suitable for this invention. Preferably, a particle size distribution ranging from smaller than 8 mesh to smaller than 100 mesh is utilized.

Preferred woods for use as comminuted materials in the present invention include any type of hard wood fiber, including cedar fiber, oak fiber, pecan fiber and elm fiber. Preferably the wood fiber comprises cedar fibers.

Preferred nut shells for use in the present invention include pecan, walnut, and almond. Preferably, the nut shells comprise at least one of pecan or walnut shells.

Preferred particle sizes for the wood fibers, nut shells, paper and cellophane will generally range from about +10 mesh to −100 mesh. An illustration of a non-limiting particle size distribution for these materials would include particles of +10 mesh, +20 mesh, +30 mesh, +50 mesh, +60 mesh, +100 mesh, and −100 mesh.

For one of the preferred comminuted plant mixtures comprising a corn cob fraction, a rice fraction, and at least one of wood fiber, nut shells, paper and shredded cellophane, the mixture will generally comprise in the range of about 5 to about 95 weight percent rice, in the range of about 5 to about 95 weight percent corncob pith or chaff, with the total of ground wood fiber, ground nut shells, ground paper and shredded cellophane comprising in the range of about 5 to about 95 weight percent (weight percent based on the total weight of plant material in the mixture. Preferred ranges are about 20 to about 75 weight percent rice, about 5 to about 35 weight percent corncob pith or chaff, with the total of ground wood fiber, ground nut shells, ground paper and shredded cellophane comprising in the range of about 20 to about 75 weight percent. More preferred ranges are about 30 to about 50 weight percent rice, about 10 to about 30 weight percent corncob pith and chaff, with the total of ground wood fiber, ground nut shells, ground paper and shredded cellophane comprising in the range of about 25 to about 50 weight percent.

As these comminuted materials are to be added to a water base well kill fluid, a small amount of oil may optionally added to the mixture. This optional oil is preferably added while the plant materials are being mixed together. This mixing may take place in a ribbon blender, where the oil in the required amount is applied by a spray bar. The oil wets the particles and adds to their lubricity while at the same time helping to control dust produced by the mixing operation. A variety of oils may be utilized in the practice of the present invention in concentrations generally ranging from about 1 percent to about 5 percent by weight based on the total weight of the mixture of comminuted materials, more preferably ranging from about 1 percent to about 2 percent. A non-limiting example of a commercially available oil suitable for use in the present invention includes ISOPAR V, available from Exxon Corporation.

The various components of the present invention may be mixed in any suitable order utilizing mixing techniques as known to those in the art, including dry mixing of the various components prior to addition to water, or alternatively, any or all of the polymer, crosslinking agent, and filter aid may be utilized in a liquid or slurry form. Most preferably, the various components are mixed in dry form, and then contacted with water or aqueous solution to form a well kill fluid. This well kill fluid is then injected into the well as is known in the art.

The polymer employed in the kill treatment of the present process should have sufficient strength when it sets up at the wellbore face to substantially reduce or eliminate the volumetric flow of formation fluid into the wellbore while the polymer does not substantially leak off into the formation matrix. By "substantially reduce" it is meant that the volumetric flow of formation fluid into the wellbore prior to placement of the gel therein is greater than the volumetric flow after placement of the gel. To satisfy this requirement the strength of the polymer should be sufficient to withstand the formation fluid pressure and the hydrostatic overbalance pressure without substantially deforming or fracturing. The formation fluid pressure is in many cases about equal to the hydrostatic head of a column of formation fluid wherein the column is equal in height to the formation depth at the point where fluid flows into the wellbore. The polymer gel must also have sufficient strength to prevent or minimize leakoff of wellbore fluids into the formation throughout the oil field wellbore operation.

The strength of the gel can be augmented at the practitioner's option by the addition of inert solids suspended or dispersed in the gel. Non-limiting examples of inert solids include, crushed rock, glass beads, plastic or cellulosic fibers and the like.

Once the well kill fluid is formulated, it is injected into the wellbore as a completely gelled composition, or alternatively, it may be injected as a partially gelled composition to allow increase of viscosity over time.

The well is killed by placing the partial flowing gel at faces across which formation fluid enters the wellbore. Placement of the partial gel at the faces can be facilitated by the use of mechanical zone isolation packers if desired. Within a predetermined time period complete gelation occurs and the gel sets up as a nonflowing gel, which substantially prevents or reduces the flow of formation fluids into the wellbore.

A "partial gel" as referred to herein has at least one chemically crosslinked site. The partial gel may or may not manifest the physical properties of a crosslinked gel, but the partial polymer gel is capable of further crosslinking to completion in situ, resulting in a gel having the desired properties without the addition of more crosslinking agent. The partial gel preferably has sufficient viscosity and/or plugging efficiency to substantially prevent or reduce gel leakoff into the formation during or subsequent to its placement.

"Complete gelation" means that the gel composition is nonflowing and is incapable of further crosslinking because one or both of the required reactants in the initial solution are consumed. Further crosslinking is only possible if either more polymer, crosslinking agent, or both are added to the gel composition.

The volume of gel injected into the wellbore is an amount which is at least sufficient to cover the faces across which the formation fluid enters the wellbore. Thus, the volume required is a function of the wellbore configuration and the adjacent formation. If the wellbore is a uniform borehole free of adjacent voids, a relatively small volume of gel will be required to kill the well. However, if the borehole is irregular with many voids in direct communication therewith, much larger volumes of gel may be required to kill the well. In any case the present process has utility in both cased and uncased wellbores depending on the particular operation it is complimenting.

Without being limited by theory, it is believed that the gel functions in the kill treatment of the present invention by coating faces and at least partially, if not entirely, filling voids, if any are present, which are in direct communication with the wellbore. In so doing, the gel plugs the faces, thereby preventing the flow of fluids across them and out of the wellbore or voids. The gel also prevents the leakoff of wellbore fluids through the wellbore or voids into the formation matrix. Although it is not always possible, it is preferable that the gel as used in the present invention fills and plugs the voids proximal the wellbore first, which blocks flow into and out of voids remote from the wellbore. This obviates the need to fill and plug remote voids, thereby advantageously limiting the required volume of treatment material to practice the present invention.

The following definitions apply to the present invention. "Plugging" is a substantial reduction in permeability. The term "face" is the interface between a wellbore or void and the formation matrix, i.e., the walls of the wellbore or the walls or boundaries of voids in direct communication with the wellbore. The "wellbore" is the bore hole formed by the drill bit in the formation. "Voids" are not formed by the drill bit, but are nevertheless anomalies having a permeability substantially equal to that of the bore hole relative to that of the matrix. Voids include fractures, fracture networks, caverns, vugs, cavities, washouts, cobble packs, unconsolidated sands, and the like, which may be proximal or which may extend far away from the wellbore. The "matrix" is homogeneous, continuous, sedimentary material having a permeability, which is substantially less than that of the wellbore or voids. "Direct communication" means that the voids are not separated from the wellbore by intervening matrix.

After the oil field wellbore operation is completed, the well may be utilized for its intended purpose, i.e., recovery of hydrocarbon fluids from the formation or injection of fluids into the formation. Since the gel does not significantly penetrate the formation matrix beyond about 1 cm from the wellbore face, the gel is nondamaging to the formation matrix to the extent that it does not substantially inhibit subsequent flow of fluids into or out of the wellbore after it is removed therefrom. Even if the gel unacceptably inhibits the flow of fluids, the problem can be remedied by perforating the matrix beyond the layer of gel penetration.

The present invention can be practiced using the additive as a primary treatment material according to the manner set forth above. In another embodiment of the invention, the additive is employed in a remedial role after the failure of a conventional well kill treatment. If one has attempted to kill a well using large volumes of a conventional material, such as a heavy brine containing a water-soluble uncrosslinked biopolymer, with little apparent success, the conventional treatment is terminated and the treatment process of the present invention is performed in the manner described above to effectively kill the well. In any case the well fluid treatment additive and fluid of the present invention is most preferred for killing wells having significant voids in direct communication with the wellbore, which would cause, or already have caused, significant leakoff of conventional kill fluids from the wellbore into the formation matrix.

The polymer gel used in the present invention is generally maintained in the wellbore throughout the performance of the oil field wellbore operation. The gel should be placed such that it enables one to perform the desired operation in the wellbore without substantially interfering with the operation. Once the oil field wellbore operation is completed, it is usual to begin or resume injection of fluids into the formation or production of formation fluids from the wellbore, depending on whether the wellbore is an injection or production wellbore. In most cases it is desirable to remove the well kill additive from the wellbore before injecting or producing fluids. The well kill additive may be removed by drilling it out or any other conventional means.

Since the polymer gels employed in the process of the present invention are generally reversible, removal of residual gel from the wellbore after the completion of a particular wellbore operation can also be accomplished by reversing the gel with a conventional breaker, such as peroxides, hypochlorites or persulfates. The breaker can be incorporated into the initial gel composition at the surface to slowly break the gel over time or the breaker can be placed in the wellbore separately to reverse the gel on contact at the desired time after completion of the wellbore operation.

Well kill fluids are known to those of skill in the art, and would generally be of the category of well fluid known as drilling fluids. Generally such fluids are liquids in which a density agent has been included to increase the density of the fluid (generally some type of metal salt), and generally also include a solid phase.

In a method of treating a well kill fluid, the well kill fluid to be treated is contacted with a liquid or solid form of the well kill additive of the present invention. Preferably, the well kill fluid is contacted with a dry mixture (i.e., solid form) of the well kill additive. Of course, the various components of the additive (i.e., polymer, crosslinking agent, and filter aid) may be added individually to the well kill fluid to be treated.

In well operation, it is also known to define a vertically limited zone into which a slurry is then pumped and subsequently squeezed by application of pressure (either from the formation itself, or by application of pressure to the zone). In a method of performing a well operation of the present invention, the well kill fluid of the present invention is pumped into a desired vertically defined zone in the well, and then "squeezed" to dewater the fluid such that a plug of the filter aid remains behind and the solution of polymer and crosslinking agent migrates into the formation. The filter aid plug remains in place to prevent or slow down the escape of the solution back into the well allowing time for the solution to form a gel plug. In this well operation, one may start with a well fluid containing the polymer, crosslinking agent and filter aid, or these various components may be introduced to the well fluid in any combination/or of one or more in liquid or dry form, or as the additive or well kill fluid as discussed above.

EXAMPLES

The following examples are provided merely to illustrate some but not all of the embodiments of the present invention, and are not intended to, nor do they, limit the scope of the claims.

DE

The DE utilized in this example was that produced by Eagle Picher Minerals, Inc., and sold under the trademark CELATOM® Diatomite ET-905. As measured, the particle size distribution was:

8% +200 mesh

92% −200 mesh

Polymer

The polymers utilized were obtained from Ciba and a water-soluble, crosslinkable, carboxylate-containing acrylamide polymers, CIBA 254 (MW from 300,000 to less than 500,000) and CIBA 935 (MW from 6 to 9 million).

Crosslinking Agent

The crosslinking agent was chromium acetate.

Formulations

Formulation No. 1
- 17.5 grams 254
- 5 grams CrIII Acetate
- 27.5 grams DE

Formulation No. 2
- 12 grams 254
- 3 grams CrIII Acetate
- 25 grams DE

Formulation No. 1
- 5 grams 935
- 3 grams 254
- 1.2 grams CrIII Acetate
- 30.8 grams DE Filter Press Test This test was run to simulate the dewatering of the DE in a subterranean formation, and subsequent formation of a plug of DE and separate crosslinked polymer.

30 ml. of plain tap water was added to a beaker and subjected to mixing at 10,000 rpm in a Hamilton Beach commercial drink mixer with a solid agitator. To this blending water was added the above formulations (three separate runs). The sample was allowed to blend for 5 minutes at 10,000 rpm. After the 5 minutes of blending, this mixture was placed into the cylinder of a filter press in which substantial dewatering of the DE slurry occurred without any pressure applied. Subsequently, 80 psi of pressure was applied to further dewater and consolidate the DE. Finally, heat was applied to the filter press to heat the consolidated DE and liquid run off. Both the filter press cylinder and collected run off (water soluble crosslinkable polymer and crosslinking agent-no visible DE) were placed into a 160 degree F. water bath and allowed to crosslink. Without being limited in theory, applicant believes that residual polymer remaining in the DE after dewatering crosslinks and serves to promote the consolidation of the DE. Once crosslinked, the collected run off for all of the formulations promotes a rigid ringing gel.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

I claim:

1. A method of modifying a well kill fluid comprising:

contacting the well kill fluid with water soluble crosslinkable polymer, a crosslinking agent, and a filter aid to form a modified well kill fluid, and wherein the filter aid comprises at least one of diatomaceous earth or pearlite.

2. The method of claim 1, wherein the polymer is an a carboxylate-containing polymer, and the crosslinking agent is selected from the group consisting of chromium (III) carboxylate complexes, aldehydes, dialdehydes, formaldehydes, glutaraldehyde, dichromates, titanium chelates, phenols, substituted phenols, ethers, aluminum citrate, and aluminates.

3. The method of claim 2, wherein the polymer comprises a low molecular weight polymer having a molecular weight less than 1,000,000, and a high molecular weight polymer having a molecular weight of at least 1,000,000.

4. The method of claim 2, wherein the polymer is a water soluble, carboxylate containing acrylamide, and the crosslinking agent is a chromium (III) carboxylate complex.

5. The method of claim 4, wherein the filter aid is diatomaceous earth.

6. The method of claim 4, wherein the filter aid is pearlite.

7. The method of claim 1, wherein the water soluble crosslinkable polymer, crosslinking agent, and filter aid, are all in solid form.

8. A method of killing a well to substantially reduce volumetric flow of a formation fluid across a wellbore face into a wellbore penetrating a formation having a formation matrix and containing said formation fluid below an earthen surface, comprising:

(a) placing a well kill fluid comprising water soluble crosslinkable polymer, a crosslinking agent, and filter aid in said wellbore at said wellbore face, wherein said fluid which is placed at said wellbore face does not significantly penetrate the formation matrix; and (b) forming a nonflowing fluid from said well kill fluid in said wellbore at said wellbore face to substantially reduce said volumetric flow of said formation fluid across said wellbore face into said wellbore, thereby killing said well, and wherein the filter aid comprises at least one of diatomaceous earth or pearlite.

9. The method of claim 8, wherein the polymer is an a carboxylate-containing polymer, and the crosslinking agent is selected from the group consisting of chromium (III) carboxylate complexes, aldehydes, dialdehydes, formaldehydes, glutaraldehyde, dichromates, titanium chelates, phenols, substituted phenols, ethers, aluminum citrate, and aluminates.

10. The method of claim 9, wherein the polymer comprises a low molecular weight polymer having a molecular weight less than 1,000,000 and a high molecular weight polymer having a molecular weight of at least 1,000,000.

11. The method of claim 9, wherein the polymer is a water soluble, carboxylate containing acrylamide, and the crosslinking agent is a chromium (III) carboxylate complex.

12. The method of claim 11, wherein the filter aid is diatomaceous earth.

13. The method of claim 11, wherein the filter aid is pearlite.

14. The method of claim 11, further comprising; and (c) removing substantially all of said nonflowing fluid from said wellbore face to substantially restore the volumetric flow of said formation fluid into said wellbore.

15. A method for reducing volumetric flow of a formation fluid across a wellbore face into a wellbore penetrating a formation having a formation matrix and containing said formation fluid below an earthen surface, comprising:

(a) placing a well kill fluid comprising water soluble crosslinkable polymer, a crosslinking agent and filter aid in said wellbore at said wellbore face, wherein said fluid which is placed at said wellbore face does not significantly penetrate the formation matrix;

(b) applying pressure to dewater the well kill fluid to form a nonflowing fluid from said well kill fluid in said wellbore at said wellbore face to substantially reduce said volumetric flow of said formation fluid across said wellbore face into said wellbore, thereby killing said well, and wherein the filter aid comprises at least one of diatomaceous earth or pearlite.

16. The method of claim 15, wherein the polymer is an a carboxylate-containing polymer, and the crosslinking agent is selected from the group consisting of chromium (III) carboxylate complexes, aldehydes, dialdehydes, formaldehydes, glutaraldehyde, dichromates, titanium chelates, phenols, substituted phenols, ethers, aluminum citrate, and aluminates.

17. The method of claim 16, wherein the polymer comprises a low molecular weight polymer having a molecular weight less than 500,000 and a high molecular weight polymer having a molecular weight of at least 500,000.

18. The method of claim 16, wherein the polymer is a water soluble, carboxylate containing acrylamide, and the crosslinking agent is a chromium (III) carboxylate complex.

19. The method of claim 18, wherein the filter aid is diatomaceous earth.

20. The method of claim 18, wherein the filter aid is pearlite.

21. The method of claim 18, further comprising; and (c) removing substantially all of said nonflowing fluid from said wellbore face to substantially restore the volumetric flow of said formation fluid into said wellbore.

22. A method of circulating a well kill fluid in a welbore penetrating a subterranean formation, comprising:

(a) providing a well kill fluid comprising water or an aqueous solution, water soluble crosslinkable polymer, a crosslinking agent, and a filter aid; and (b) circulating the well kill fluid in the wellbore, and wherein the filter aid comprises at least one of diatomaceous earth or pearlite.

23. The method of claim 22, wherein the polymer is an a carboxylate-containing polymer, and the crosslinking agent is selected from the group consisting of chromium (III) carboxylate complexes, aldehydes, dialdehydes, formaldehydes, glutaraldehyde, dichromates, titanium chelates, phenols, substituted phenols, ethers, aluminum citrate, and aluminates.

24. The method of claim 23, wherein the polymer comprises a low molecular weight polymer having a molecular weight less than 500,000, and a high molecular weight polymer having a molecular weight of at least 500,000.

25. The method of claim 23, wherein the polymer is a water soluble, carboxylate containing acrylamide, and the crosslinking agent is a chromium (III) carboxylate complex.

26. The method of claim 25, wherein the filter aid is diatomaceous earth.

27. The method of claim 25, wherein the filter aid is pearlite.

28. The method of claim 25, further comprising reinforcing material selected from the group consisting of hydrophilic fibers, hydrophobic fibers, and comminuted plant material.

29. A method of modifying a well kill fluid circulating in a wellbore penetrating a subterranean formation, comprising:

introducing a water soluble crosslinkable polymer, crosslinking agent, and filter aid to the circulating well kill fluid, and wherein the filter aid comprises at least one of diatomaceous earth or pearlite.

30. The method of claim 29, wherein the polymer is an a carboxylate-containing polymer, and the crosslinking agent is selected front the group consisting of chromium (III) carboxylate complexes, aldehydes, dialdehydes, formaldehydes, glutaraldehyde, dichromates, titanium chelates, phenols, substituted phenols, ethers, aluminum citrate, and aluminates.

31. The method of claim 30, wherein the polymer comprises a low molecular weight polymer having a molecular weight less than 500,000, and a high molecular weight polymer having a molecular weight of at least 500,000.

32. The method of claim 30, wherein the polymer is a water soluble, carboxylate containing acrylamide, and the crosslinking agent is a chromium (III) carboxylate complex.

33. The method of claim 32, wherein the filter aid is diatomaceous earth.

34. The method of claim 32, wherein the filter aid is pearlite.

* * * * *